(12) United States Patent
Domschot

(10) Patent No.: US 12,083,616 B2
(45) Date of Patent: Sep. 10, 2024

(54) FLOATING ELECTRODE WELDING

(71) Applicant: Tec-Option, LLC, Bloomfield Hills, MI (US)

(72) Inventor: Bryan W. Domschot, Blissfield, MI (US)

(73) Assignee: Tec Option, LLC, Bloomfield Hills, MI (US)

( * ) Notice: Subject to any disclaimer, the term of this patent is extended or adjusted under 35 U.S.C. 154(b) by 650 days.

(21) Appl. No.: 17/141,211

(22) Filed: Jan. 4, 2021

(65) Prior Publication Data
US 2021/0205914 A1    Jul. 8, 2021

Related U.S. Application Data

(60) Provisional application No. 62/956,854, filed on Jan. 3, 2020.

(51) Int. Cl.
*B23K 11/00*    (2006.01)
*B23K 11/30*    (2006.01)
*B23K 11/31*    (2006.01)
*B23K 11/36*    (2006.01)

(52) U.S. Cl.
CPC ........ *B23K 11/002* (2013.01); *B23K 11/3081* (2013.01); *B23K 11/31* (2013.01); *B23K 11/366* (2013.01)

(58) Field of Classification Search
CPC .............. B23K 11/002; B23K 11/0046; B23K 11/3081; B23K 11/31; B23K 11/366
See application file for complete search history.

(56) References Cited

U.S. PATENT DOCUMENTS

| | | | | |
|---|---|---|---|---|
| 6,008,463 A * | 12/1999 | Aoyama | ................ | B23K 11/31 219/93 |
| 6,576,859 B2 * | 6/2003 | Cabanaw | ............. | B23K 11/315 219/93 |
| 8,294,064 B1 * | 10/2012 | Raiche | ............... | B23K 11/3081 219/136 |

\* cited by examiner

*Primary Examiner* — Dana Ross
*Assistant Examiner* — Joe E Mills, Jr.
(74) *Attorney, Agent, or Firm* — Harness, Dickey & Pierce, P.L.C.

(57) ABSTRACT

A welder having first and second electrodes configured to clamp and weld a fastener to a workpiece at an opening in the workpiece, wherein the first electrode is configured to move in a direction transverse to a clamping direction to center the fastener with the opening. The welder can carry out a method of aligning and welding an internally-threaded nut to a panel at an opening in the panel. The method includes the steps of: centering the opening in the panel relative to a first electrode using a tapered guide pin that extends into the opening; centering the nut relative to the opening using the tapered guide pin; clamping the nut and panel between the first electrode and a second electrode; and welding the nut to the panel by passing current through the nut and panel from one of the electrodes to the other electrode.

20 Claims, 3 Drawing Sheets

FLOATING ELECTRODE WELDING

TECHNICAL FIELD

The present invention relates to welding equipment for aligning and welding workpieces together and, in particular, to welding equipment used for attaching internally-threaded nuts over bolt openings in panels.

BACKGROUND

Fixtures are sometimes used to position workpieces together into contact for welding. For some welding operations, an external fixture may be impractical, thereby complicating the proper alignment of the two components to be welded. One example is for automotive body panels and other structural panels for which the panel has one or more apertures (or openings) into or over which an internally-threaded nut or other fastener is welded so that the panel can be bolted to a frame or other supporting member, or so that other components can be bolted to and supported by the panel itself.

In these types of welding applications, some component dimensions and process tolerances can be well controlled, but others may not be, resulting in rejected parts that causes a waste of resources. For example, while the size of the panel opening can typically be controlled from part to part with very tight tolerances, the same cannot always be said for the position of the opening with respect to a datum. The panel may include three-dimensional contours and may be much larger than the fastener, such as the size of a vehicle door panel relative to an individual nut that must be welded to the panel. The inventor has discovered that such panels are often supported between the welding electrodes by a robot or other fixturing that holds and controls the panel at a location remote from the opening, thereby introducing error in proper positioning of the opening at the welding electrodes. And also that manipulation and proper locating of the relatively small nut over the panel opening and between the welding electrodes can be difficult and inconsistent.

SUMMARY

It is an object of the invention to overcome these problems in welding accuracy, both for welding nuts over openings in panels in particular, as well as for welding various different types of workpieces together in general. And while specific embodiments are provided for welding fasteners to openings in panels, it will be apparent to those skilled in the art how the various general concepts disclosed herein can be applied more broadly to other types of workpieces. It will be understood that the primary welding considered herein is of ferrous, aluminum or other metals and metal alloys that are typically used for body panels, but that the various general concepts disclosed herein can be used for numerous different types of weldable materials and welding techniques.

In one aspect of the invention, there is provided an electrode assembly for use with a welder to weld first and second workpieces together. The electrode assembly comprises: an electrode having a contact surface at a first end and a base at an opposite second end; a guide pin protruding from the first end along an axis; and a conductive support slidingly coupled with the base of the electrode. The contact surface is adapted to contact the first workpiece at an opening in the first workpiece when the guide pin is received in said opening. The conductive support is adapted for electrical connection to a power source when the assembly is installed in the welder to provide a conductive path from one pole of the power source to the electrode such that, when the contact surface contacts the first workpiece and a second electrode connected to an opposite pole of the power source is in electrical contact with the second workpiece, and the workpieces are held together, current flows through the workpieces to form a weld therebetween at the opening.

In another aspect of the invention, there is provided a welder that includes the electrode assembly, in which case the electrode may comprise a first electrode and the welder may include the second electrode which is arranged to move in a clamping direction toward the contact surface of the first electrode so as to clamp the first and second workpieces between the first and second electrodes when welding the workpieces together. The guide pin fits within the opening in the first workpiece and centers the first electrode relative to the opening by movement of the first electrode relative to the conductive support in a direction transverse to the clamping direction. The guide pin fits within an opening in the second workpiece and centers the opening in the second workpiece relative to the opening in the first workpiece when the workpieces are clamped together by the first and second electrodes.

In another aspect of the invention, there is provided a welder comprising first and second electrodes configured to clamp and weld a fastener to a workpiece at an opening in the workpiece, wherein the first electrode is configured to move in a direction transverse to a clamping direction to help center the fastener with the opening.

In yet another aspect of the invention, there is provided a method of aligning and welding an internally-threaded nut to a panel at an opening in the panel. The method comprises the steps of: centering the opening in the panel relative to a first electrode using a tapered guide pin that extends into the opening; centering the nut relative to the opening using the tapered guide pin; clamping the nut and panel between the first electrode and a second electrode; and welding the nut to the panel by passing current through the nut and panel from one of the electrodes to the other electrode.

BRIEF DESCRIPTION OF THE DRAWINGS

Preferred exemplary embodiments will hereinafter be described in conjunction with the appended drawings, wherein like designations denote like elements, and wherein.

DESCRIPTION OF EMBODIMENTS

Figure 1:
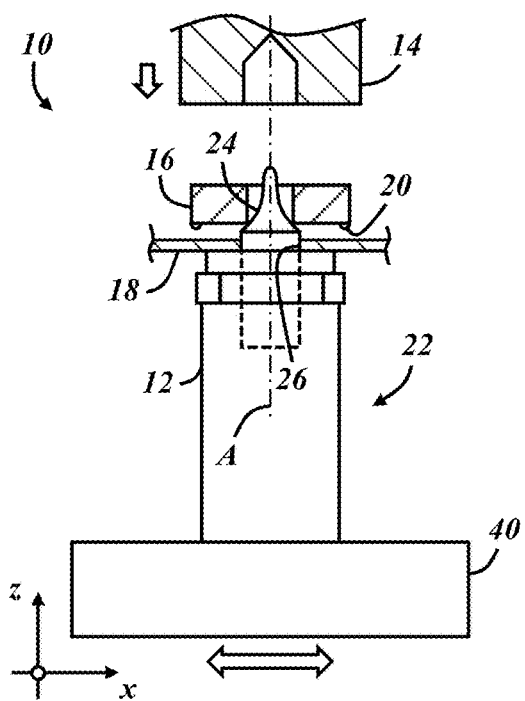
FIG. 1 depicts relevant portions of a welder constructed in accordance with an embodiment of the invention, the welder including an electrode assembly having a guide pin and a first, floating electrode.

FIG. 1 illustrates a portion of a welder 10 that includes first and second electrodes 12, 14. Portions of the welder not shown can be conventional. The exemplary welder 10 is a resistance welder configured to clamp and weld first and second workpieces 16, 18 together between the electrodes 12, 14. The welder 10 may further include other non-illustrated components, such as a framework, a power supply, fixturing, sensors, electrical wiring, additional electrode pairs, a clamping mechanism, and/or actuators for moving the electrodes 12, 14 or for operating the clamping mechanism. The welder 10 may for example be a C-frame welder including a vertical frame member, a stationary lower frame member supporting the first electrode 12, and an upper frame member having a portion that is moveable in the vertical direction while supporting the second electrode 14. Other orientations and movement combinations are possible.

The workpieces 16, 18 and the second electrode 14 are shown in cross-section in the side view of FIG. 1. In this example, the first workpiece 16 is a fastener, such as an internally threaded nut, which is to be welded to a sheet metal workpiece 18, such as a vehicle body panel. The illustrated fastener 16 is a projection weld nut with projections 20 configured to concentrate electric current along the perimeter of the fastener and to melt during welding to form part of the weld joint. Piloted weld nuts or any other type of fastener may be used with or without energy-concentrating projections.

The first electrode 12 is a lower electrode in this example and is part of an electrode assembly 22, which also includes a guide pin 24. The guide pin 24 is sized to fit through an opening 26 formed in the workpiece 18 and is tapered to receive and help position the fastener 16 prior to clamping and welding. The guide pin 24 is moveable with respect to the electrode 12 in the clamping direction (z) along an electrode axis (A). The pin 24 may for example be spring-loaded and biased toward the extended position of FIG. 1, or its position may be controlled by an actuator. The guide pin 24 may have a differently shaped profile, such as a pilot type, a dome type, a chamfer type, or an E-Z load type profile.

To form a weld joint at the opposing surfaces of the two workpieces 16, 18, the sheet metal piece 18 is first positioned between the electrodes 12, 14 with the guide pin 24 protruding through the opening 26. Then, the fastener 16 is positioned on the guide pin 24, and the electrodes 12, 14 are moved toward each other so that the second electrode 14 contacts the fastener. The guide pin 24 moves toward a retracted position to permit the electrodes 12, 14 to continue their relative movement toward each other until the fastener 16 contacts and is clamped together with the workpiece 18 between the electrodes. A voltage potential is then applied across the electrodes 12, 14 such that electric current passes from one electrode to the other through the clamped workpieces 16, 18. With sufficient current, the workpieces 16, 18 become molten at the relatively high-resistance junction between the projections 20 and the opposing workpiece 18 to form a weld joint when the current flow is halted and the workpieces begin to cool.

As indicated by the double-headed arrow in FIG. 1, the first electrode 12 is permitted (able) to move in a direction transverse to the clamping direction during the assembly process. In the illustrated example, the first electrode 12 is permitted to move with two translational degrees of freedom in the x- and y-directions—i.e., with planar movement along an x-y plane. This movement may be with respect to the second electrode 14, with respect to a framework of the welder, and/or with respect to other components of the electrode assembly 22, as discussed further below. The particularly illustrated welder 10 may be said to have a floating lower electrode 12.

Figure 2:
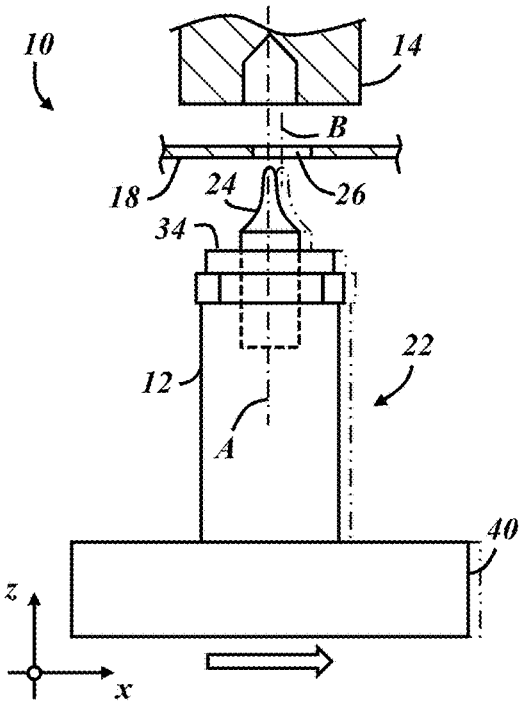
FIG. 2 is a view as in FIG. 1 depicting the lateral movement of the guide pin and first electrode during self-centering of the electrode on an opening in a workpiece panel.

This permitted electrode movement addresses certain manufacturing problems, an example of which is illustrated in FIG. 2. In this example, a central axis (B) of the opening 26 in the workpiece 18 is not aligned with the electrode axis (A) as presented between the electrodes 12, 14. While the size of the opening 26 can typically be controlled from part to part with very tight tolerances, the same cannot always be said for the position of the opening 26 with respect to a datum. The workpiece 18 often includes three-dimensional contours and is generally much larger than the fastener 16. The workpiece 18 may be supported between the electrodes 12, 14 by a robot or other fixturing at a control surface of the workpiece, which may or may not be remote from the opening 26. Also, the workpiece 18 may include multiple openings 26 at which multiple discrete fasteners are to be welded, and the openings may be originally formed with reference to a different datum than the one used in the welding process.

The floating electrode 12 self-adjusts to align the electrode axis (A) with the opening axis (B) when the workpiece 18 is brought into full intended contact with the electrode during loading of the workpiece over the guide pin 24, during clamping, and/or during welding, thereby ensuring better alignment of the fastener 16 with the opening 26. In the example of FIG. 2, the first electrode 12 is permitted to move in the positive x-direction (i.e., to the right in the figure) and is shown in phantom after movement to align the two axes (A and B). The floating electrode 12 can also preserve axial alignment when the sheet metal workpiece and/or fixturing flex under the electrode clamping forces. There is no need to adjust the radial position of the second electrode 14, although it is possible to also configure the second electrode as a floating electrode.

Figure 3:
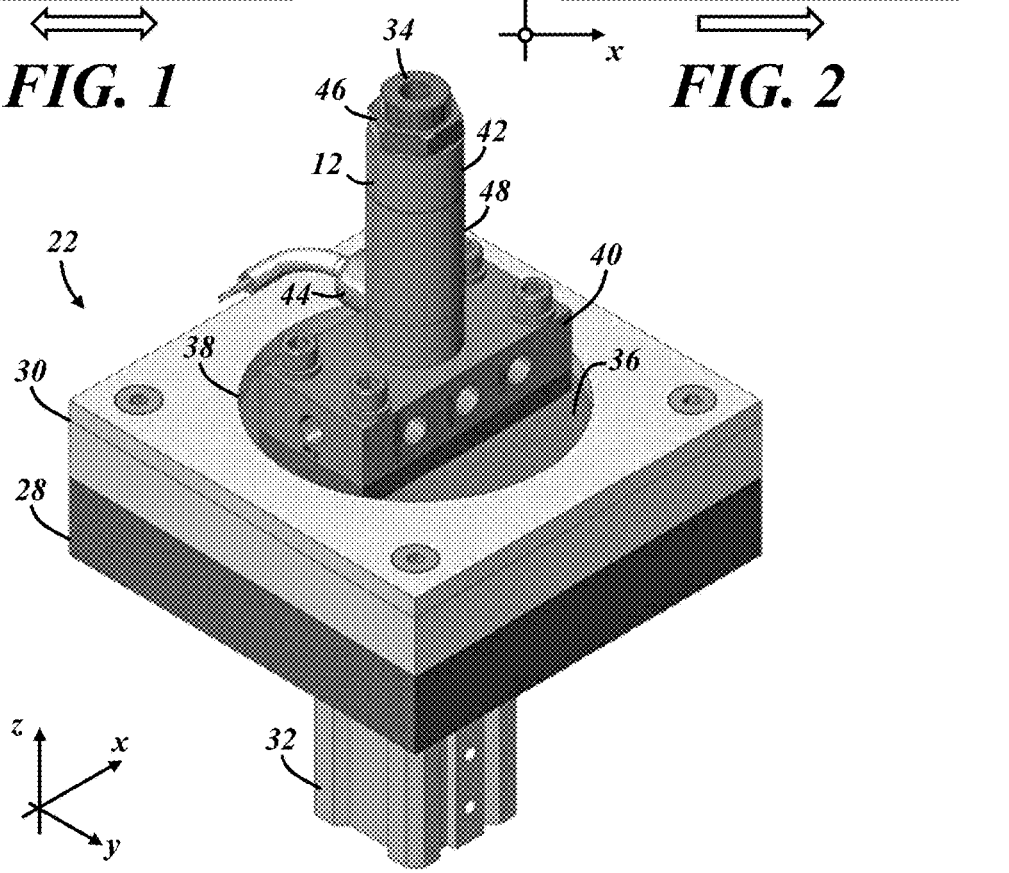
FIG. 3 is an isometric view of the electrode assembly of FIGS. 1 and 2.

FIG. 3 is an isometric view of the electrode assembly 22, illustrating the first electrode 12, a conductive support 28, a retainer 30 that holds the electrode 12 on the support 28, and an actuator 32. The guide pin is omitted in FIG. 3. The electrode 12 includes a contact surface 34 at one end and a base 36 at an opposite end. The contact surface 34 is adapted to contact the workpiece 18 at the opening 26 in the workpiece 18 when the guide pin is received in the workpiece opening. In the illustrated example, the contact surface 34 is annular and circumscribes the opening 26 when in position on the workpiece 18. The electrode 12 is configured to provide an electrically conductive path between the conductive support 28 and the contact surface 34. In particular, the electrode 12 may include a continuous conductive path between the support 28 and the contact surface 34. The continuous conductive path is formed from a highly conductive metal such as copper or a copper alloy.

In this example, the base 36 of the electrode has a disc shape with an outer diameter larger than that of an opening 38 of the retainer 30. The base 36 may include or be formed from the highly conductive metal, while the retainer 30 may be formed from a less conductive material, such as a steel or aluminum alloy or a composite material. In the example of FIG. 3, the electrode 12 also includes an electrode body 40 and a tower 42 between the base 36 and the contact surface 34. The body 40 may also include or be formed from the highly conductive metal and is configured for attachment to the base 36, in this case via threaded fasteners. The body 40 may include various openings, ports, and/or attachment points for other components of the welder. The example of FIG. 3 includes an interface for a connector 44 that facilitates communication between a controller and one or more sensors internal to the electrode, such as an LVDT housed in the tower 42.

The tower 42 extends between the body 40 and a removable and replaceable contact 46, which includes the contact surface 34. The tower 42 may also include or be formed from the highly conductive metal and may serve multiple functions, such as spacing the contact surface 34 away from the electrode base 36 to reach into portions of workpieces with three-dimensional contours and/or housing other electrode components such as sensors or transducers. The conductor portion of the tower 42 may extend through a sleeve portion 48 within which such sensors are housed. The electrode 12 may further include one or more electrically insulating layers where it is desired to prevent welding current from passing from the highly conductive metal to other components. The body 40, tower 42, contact 46, and/or guide pin 24 may be available as an off-the-shelf electrode subassembly. Suitable electrode subassemblies may be available from CenterLine (Windsor, ON, Canada) under the VeriFast tradename, to name one example.

Figure 4:
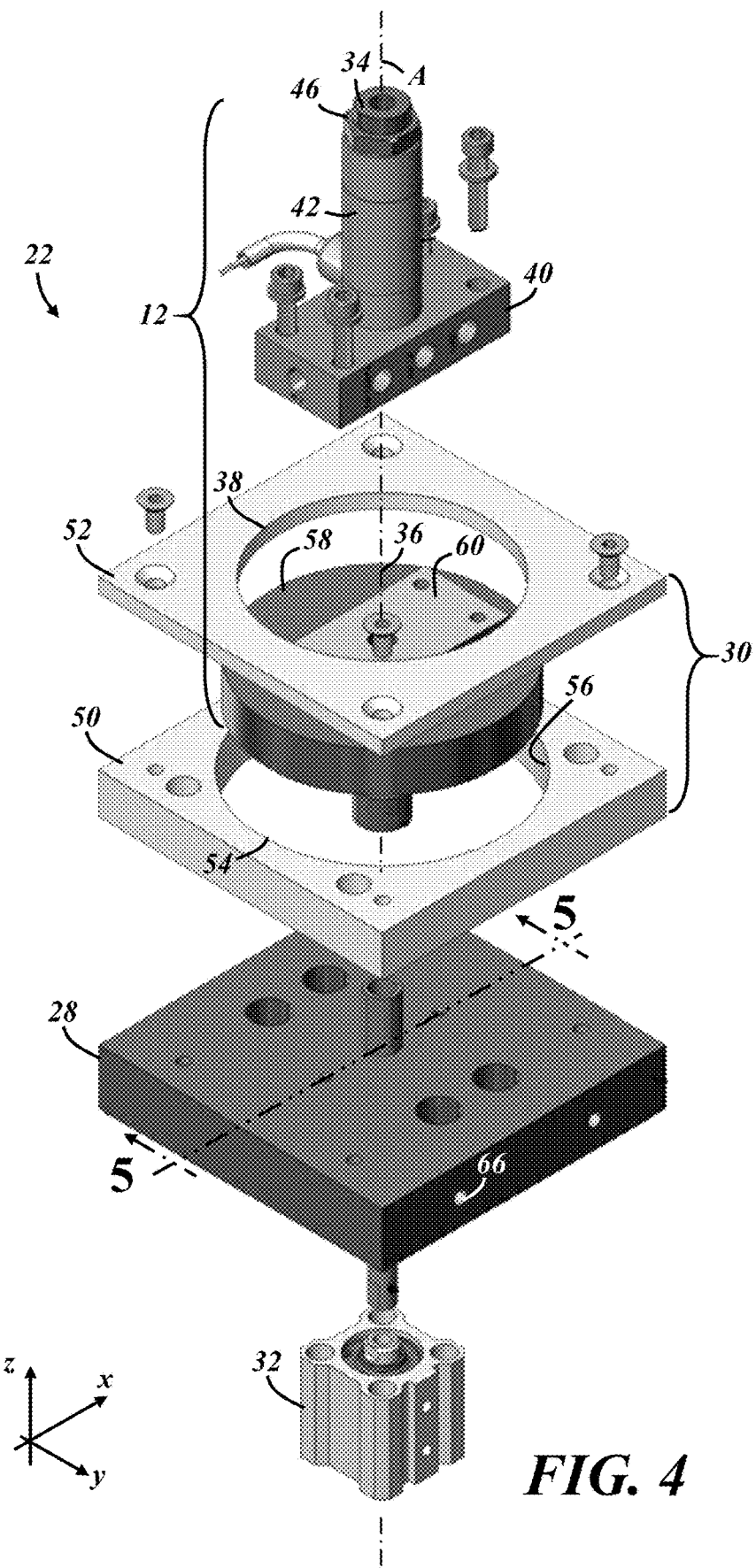
FIG. 4 is an exploded view of the electrode assembly of FIG. 3.

FIG. 4 is an exploded view of the electrode assembly 22 of FIG. 3 and illustrates some of its components in further detail. For example, the illustrated retainer 30 is formed in two distinct parts that are attached together, including a radial retaining portion 50 and an axial retaining portion 52. The radial retaining portion 50 is attached to the conductive support 28 and includes a central opening 54 extending therethrough defined by a wall 56 that circumscribes the base 36 of the electrode 12. The wall 56 may define the extent to which the base 36 can move in an x-y plane, even in the absence of the axial retaining portion 52. The base 36, and thereby the electrode 12, may have a home position at which a gap is defined around the base where it opposes the wall 56. For example, the home position may be a position at which the base 36 and/or the electrode axis (A) is centered within the retainer and/or aligned with an axis of the second electrode of the welder.

The axial retaining portion 52 is attached to the radial retaining portion 50 and includes the opening 38 which is smaller than the diameter of the base 36. The axial retaining portion 52 defines the extent to which the base 36 can move away from the conductive support 28 in the axial direction, even in the absence of the radial retaining portion 50. The allowable axial movement may be very small relative to the permitted radial movement—at least an order of magnitude smaller in some cases. For example, the allowable axial movement of the electrode 12 with respect to the conductive support may be 0.010 inches or less. An axial distance from the conductive support 28 to the axial retaining portion 52 (e.g., the axial length of the wall 56) may be larger than an axial thickness of a disc portion 58 of the base 36 by an amount in a range from 0.001 to 0.020 inches, or from 0.005 to 0.010 inches. In contrast, a gap formed between the outer diameter of the base 36 and the surrounding wall 56 may be in a range from 0.1 to 0.2 inches, or from 0.125 to 0.175 inches. The retainer 30 may have dimensions relative to the base 36 such that the base is slidingly coupled with the conductive support 28 and thus free to move in a direction transverse to the clamping direction when a radial load is applied to the guide pin. The retainer 30 may also have dimensions relative to the base 36 such that transverse movement of the base is limited to one half of a diameter of the guide pin in each direction, or less.

As shown in FIG. 4, the base 36 may also include a platform or other standing feature 60 extending away from the disc portion 58 for mounting the body 40 of the electrode 12. The interface formed where the base 36 opposes the electrode body 40 represents an electrical junction between the base and the electrode body. In some embodiments, a coating comprising a metal having a higher electrical conductivity than the high conductivity metal of the base 36 and body 40 is disposed at the interface. For example, a coating comprising metallic silver may be disposed on the surface of the platform 60 of the base 36 before the electrode body 40 is attached, the base being formed from copper or a copper alloy.

The conductive support 28 is adapted for electrical connection to a power source when the electrode assembly 22 is installed in the welder to provide a conductive path from one pole of the power source to the electrode 12. For example, the upper electrode 14 may be electrically connected with a positive side of a power supply and the conductive support 28 may be grounded or electrically connected with a negative side of the power source. The terms "positive" and "negative" are only relative terms as used here. One pole of the power supply may simply be at a higher voltage potential than the other, and the potential between the poles may vary, such as with an alternating current power source.

The electrode assembly 22 may also be configured such that the sliding engagement between the base 36 of the electrode 12 and the conductive support 28 becomes a clamped engagement when the two workpieces 16, 18 are clamped between the opposing electrodes 12, 14. In other words, the electrode 12 may only be considered as a floating electrode while there is no axial load pressing the electrode base 36 against the conductive support 28. The freedom of movement of the electrode base 36 in an x-y plane is partly facilitated by the above-described small axial clearance provided by the difference in the thickness of the base and the height of the wall 56 of the retainer 30. When the workpieces are clamped between the electrodes 12, 14, the resulting axial load helps clamp the electrode base 36 to the support 28 and thus improves electrical contact between the electrode 12 and support 28 when clamped relative to the electrical contact while floating.

Figure 5:
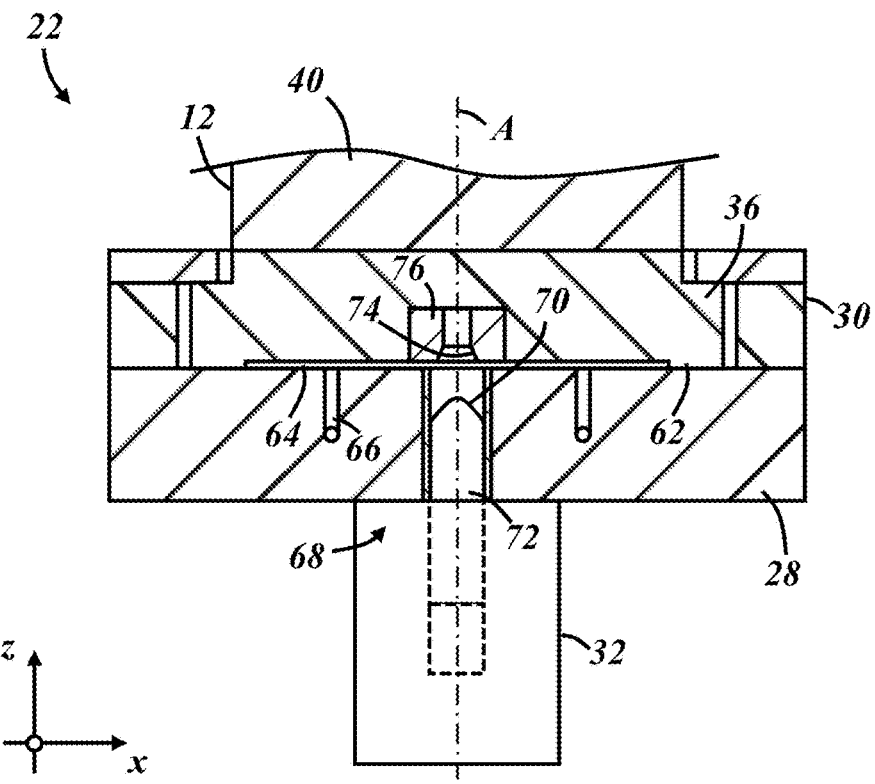
FIG. 5 depicts the lower portions of the electrode assembly of FIGS. 1 and 2 and showing a first embodiment of a centering mechanism for the first electrode.

As shown in FIG. 5, the base 36 may include a lip 62 extending along at least a portion of the perimeter of the base and toward the conductive support 28. The lip 62 defines the interface at which the electrode 12 contacts the support 28, which in this case is an annular surface. The lip 62 can help concentrate the electric current along a desired part of the base 36—i.e., along the perimeter in this case. As with the interface between the base 36 and the electrode body 40, a coating comprising a metal of higher conductivity than the conductive support 28 and the base 36 may be disposed along this interface, such as on the annular surface defined by the lip 62.

The lip 62 may define a fluid volume 64 between the base 36 and the support 28. In this example, the fluid volume 64 is radially bounded by the inner diameter of the lip 62, and fluid flow channels 66 are provided in the conductive support 28 to pressurize the fluid volume. A cushion of fluid may thereby optionally be provided between the electrode base 36 and the support 28 to facilitate the floating nature of the electrode 12 and to continually flush the fluid volume 64. The thickness of the cushion of fluid is defined by the axial dimension of the lip 62, which may be in a range from 0.005 to 0.030 inches, or from 0.010 to 0.020 inches. The fluid may be air or any other suitable fluid. The fluid pressure between the base 36 and the support 28 provides an axial force on the electrode 12 in a direction away from the support 28. The clamp load provided between the electrodes 12, 14 when clamping the workpieces together must be greater than this fluid pressure to clamp the electrode base 36 to the support 28 to achieve optimal electrical contact. In some cases, an additional clamping mechanism may be necessary to provide added clamp load between the electrode 12 and the conductive support 28 beyond the load provided to clamp the workpieces together.

The electrode assembly 22 may include a centering mechanism 68. In the illustrated example, the centering mechanism 68 includes the actuator 32 (shown schematically) and a cam surface 70. In this case, the actuator 32 is a fluid powered cylinder (e.g., a pneumatic cylinder) that operates to axially move a shaft 72 that includes the cam surface 70. The cam surface 70 moves against an angled surface 74 of the electrode base 36 to return the base 36, and thereby the electrode 12, to its home position, which is the center of the retainer 30 and which aligns the electrode axis (A) with an axis of the second electrode 14 in this example. The cam surface 70 and the angled surface 74 are generally conical and complementary in this case, and the angled surface 74 of the base 36 is provided by an insert 76 pressed into the disc portion of the base. The actuator 32 then moves the shaft 74 in the opposite direction to restore freedom of radial movement to the electrode 12.

A welding cycle may include presenting the workpiece 18 between the electrodes 12, 14 with the guide pin 24 extending through the opening 26 in the workpiece, followed by providing the other workpiece 16 on the guide pin. The electrodes 12, 14 may then be moved toward each other to clamp the workpieces together. During this pre-weld period, at least the first electrode 12 operates as a floating electrode and is free to move and radially self-adjust to the center of the opening 26 and, thereby, to the center of the fastener 16. The electrodes 12, 14 continue moving toward each other to apply the clamp load, during which time the guide pin 24 is retracted or pressed into the floating electrode 12. This same clamp load, and optionally an additional clamp load, changes the electrode 12 from a floating condition to a clamped condition, in which the electrode base 36 is clamped and in full contact with the conductive support 28. A voltage potential is applied across the support 28 and the second electrode 14, and electric current flows between the electrodes and, thereby, through the interface between the workpieces 16, 18. Molten material at the interface forms the weld joint. The voltage is removed, and the weld joint cools. The electrodes 12, 14 are moved apart, and the clamp load is thus removed. After the welded workpieces are removed from between the electrodes, the centering mechanism 68 operates to return the floating electrode 12 to its home position in preparation for another welding cycle.

Figure 6:
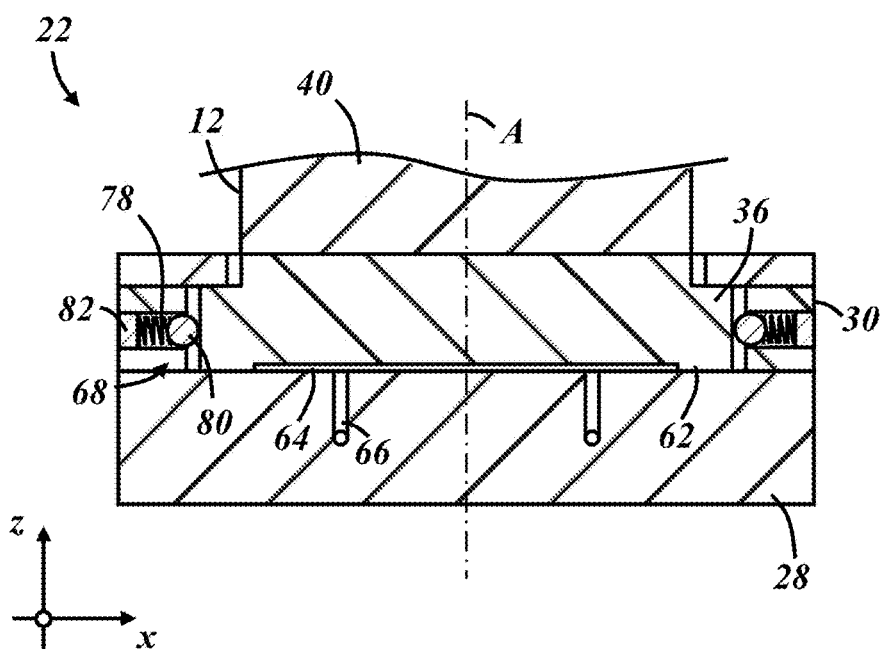
FIG. 6 is a view as in FIG. 5 showing a second embodiment of a centering mechanism for the first electrode.

FIG. 6 illustrates another example of a centering or home-return mechanism 68 in which the electrode 12 is biased toward the home position by springs 78 or other suitable biasing elements. In the illustrated example, coil springs positioned at a plurality of locations around the base 36 bias the base toward the home position. Bearing surfaces are provided by balls 80, and spring compression is adjustable via set screws 82 or other means. In one embodiment, four biasing elements 78 are spaced about the base 36 at 90-degree increments. Other types of centering mechanisms are possible, such as radially-acting actuators or electromagnetic positioners.

In the illustrated example, the electrode 12 has a third degree of freedom of movement while in the floating condition. In particular, the electrode 12 has a rotational degree of freedom of movement about the electrode axis (A) in addition to the above-described two translational degrees of freedom. In some embodiments, it may be desired to limit or eliminate the rotational degree of freedom, for example to prevent a corner of the illustrated electrode body 40 from contacting the workpiece 18 in situations where the workpiece 18 is shaped so that it is in close proximity with the electrode body 40 during welding. In one example, the body 36 and the surrounding wall 56 of the retainer 30 are non-circular. For instance, the disc-shaped body 36 in the figures may be made with a flat portion along the perimeter in the manner of a keyed shaft to prevent excessive rotation about the electrode axis. In another example, a pin or other projection can protrude from the wall 56 of the retainer 30 and into a slot along the perimeter of the disc. The slot can extend only as far around the perimeter of the body 36 as is desired to prevent rotation beyond a particular angle about the axis (A). In other examples, the body 36 is polygonal rather than disc-shaped. More generally, the body 36 may include a plate 58, with the plate being a disc shape in the example in the figures.

In embodiments in which the home-return mechanism 68 includes a linear actuator 32, as in FIGS. 3-5, the actuator can serve an additional function as part of a clamping mechanism. As noted above, there may be instances in which the clamp load provided by between the opposed electrodes 12, 14 is not enough on its own to sufficiently clamp the base 36 of the floating electrode 12 against the conductive support 28 to halt the floating and to provide optimal electrical contact during welding. In such cases, the actuator 32 can be configured to return the electrode 12 to its home position when extended with the shaft 72 moving toward the electrode 12 and to clamp the electrode 12 to the conductive support 28 when retracted—effectively pulling the electrode down onto the conductive support. A flexible or jointed linkage may be affixed to the shaft 72 and the base 36 for this purpose, and/or a three-position actuator may be employed.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. An electrode assembly for use with a welder to weld first and second workpieces together, the electrode assembly comprising:
   an electrode having a contact surface at a first end and a base at an opposite second end;
   a guide pin protruding from the first end along an axis; and a conductive support slidingly coupled with the base of the electrode, wherein the contact surface is adapted to contact the first workpiece at an opening in the first workpiece when the guide pin is received in said opening, and wherein the conductive support is adapted for electrical connection to a power source when the assembly is installed in the welder to provide a conductive path from one pole of the power source to the electrode such that, when the contact surface contacts the first workpiece and a second electrode connected to an opposite pole of the power source is in electrical contact with the second workpiece, and the workpieces are held together, current flows through the workpieces to form a weld therebetween at the opening.

2. The electrode assembly of claim 1, wherein the conductive support is coupled with said base and configured to permit transverse movement of the base in response to a radial force on the guide pin.

3. The electrode assembly of claim 1, further comprising a retainer that holds the base on the conductive support with at least a portion of said base disposed between the retainer than the conductive support.

4. The electrode assembly of claim 3, wherein rotation of the base within the retainer is limited to less than 360 degrees.

5. The electrode assembly of claim 3, wherein the retainer comprises a wall extending at least partially around the base.

6. The electrode assembly of claim 5, wherein the base is disc-shaped and the wall opposes a perimeter of the base across a gap.

7. The electrode assembly of claim 1, further comprising a fluid port opening on a surface of the conductive support facing said base to provide a fluidic cushion between the conductive support and said base when fluid flows from said port.

8. The electrode assembly of claim 1, wherein the electrode has a home position and the electrode assembly is configured to return the electrode to the home position after being moved away from the home position.

9. The electrode assembly of claim 8, wherein the base is biased toward the home position.

10. The electrode assembly of claim 8, further comprising an actuator that returns the electrode to the home position when activated.

11. The electrode assembly of claim 1, wherein the base comprises a plate and a lip extending from a perimeter of the plate toward the conductive support so that current flow between the conductive support and the base is directed through the lip.

12. The electrode assembly of claim 1, further comprising a conductive coating at an interface between the base and the conductive support, the conductive coating comprising a metal having a higher electrical conductivity than a metal from which the base and the conductive support are made.

13. A welder comprising:
a workpiece holding portion; and
the electrode assembly of claim 1.

14. The welder of claim 13, wherein the electrode comprises a first electrode and wherein the welder includes the second electrode which is arranged to move in a clamping direction toward the contact surface of the first electrode so as to clamp the first and second workpieces between the first and second electrodes when welding the workpieces together, and wherein the guide pin fits within the opening in the first workpiece and centers the first electrode relative to the opening by movement of the first electrode relative to the conductive support in a direction transverse to the clamping direction, and wherein the guide pin fits within an opening in the second workpiece and centers the opening in the second workpiece relative to the opening in the first workpiece when the workpieces are clamped together by the first and second electrodes.

15. The welder of claim 14, wherein the first electrode comprises a lower electrode having the contact surface facing upwardly and the guide pin extending upwardly from the first electrode to a position above the contact surface, and wherein the welder is configured to weld an internally threaded nut, comprising the second workpiece, to a panel, comprising the first workpiece, and wherein the guide pin is tapered and sized such that the opening in the panel fits down over and past the taper on the guide pin and the opening in the nut fits onto the taper and centers the nut above the panel at the opening.

16. The welder of claim 15, wherein the guide pin is movable along the axis and is biased upwardly along the axis, and wherein the guide pin retracts downwardly during clamping under the force of the second electrode pressing down on the nut which presses down on the taper on the guide pin to move the guide pin downwardly until the nut engages the panel about the opening.

17. The welder of claim 15, further comprising a centering mechanism that returns the first electrode and guide pin to a home location between welding cycles.

18. A welder comprising first and second electrodes configured to clamp and weld a fastener to a workpiece at an opening in the workpiece, wherein the first electrode is able to move in a direction transverse to a clamping direction to center the fastener with the opening.

19. The welder of claim 18, wherein the first electrode is held in sliding engagement with a conductive support that is configured to connect the first electrode to a source of welding current, and wherein the first electrode operates in a floating condition in which the first electrode is able to move relative to the conductive support in the direction transverse to the clamping direction and center itself about the opening prior to clamping of the fastener to the workpiece by the first and second electrodes, and wherein during clamping of the fastener to the workpiece by the first and second electrodes, the first electrode changes from the floating condition to a clamped condition in which the first electrode is clamped into full contact with the conductive support and does not move relative to the conductive support in the direction transverse to the clamping direction.

20. A method of aligning and welding an internally-threaded nut to a panel at an opening in the panel, comprising the steps of:
centering the opening in the panel relative to a first electrode using a tapered guide pin that extends into the opening including sliding a conductive support coupled with the base of the first electrode;
centering the nut relative to the opening using the tapered guide pin;
clamping the nut and panel between the first electrode and a second electrode; and
welding the nut to the panel by passing current through the nut and panel from one of the electrodes to the other electrode.

* * * * *